( 12 ) United States Patent
Cheng et al.

(10) Patent No.: US 8,719,294 B2
(45) Date of Patent: May 6, 2014

(54) NETWORK DIGITAL CREATION SYSTEM AND METHOD THEREOF

(75) Inventors: Hsu Chen Cheng, Yonghe (TW); Yee Chiang Heng, Yonghe (TW); Chia Ching Chou, Yonghe (TW); Tsung Hwa Chang, Yonghe (TW)

(73) Assignee: Fiitotech Company Limited, Taipei (TW)

( * ) Notice: Subject to any disclaimer, the term of this patent is extended or adjusted under 35 U.S.C. 154(b) by 467 days.

(21) Appl. No.: 12/723,523

(22) Filed: Mar. 12, 2010

(65) Prior Publication Data

US 2011/0225179 A1  Sep. 15, 2011

(51) Int. Cl.
*G06F 17/30* (2006.01)
*G06F 7/00* (2006.01)

(52) U.S. Cl.
USPC .......................................... 707/769; 715/758

(58) Field of Classification Search
CPC ............................ G06F 21/629; G06F 9/45545
USPC .......................................... 707/769; 715/758
See application file for complete search history.

(56) References Cited

U.S. PATENT DOCUMENTS

| | | | | |
|---|---|---|---|---|
| 4,952,051 | A | * | 8/1990 | Lovell et al. ..................... 352/87 |
| 5,337,407 | A | * | 8/1994 | Bates et al. ..................... 715/751 |
| 5,796,945 | A | * | 8/1998 | Tarabella ...................... 709/219 |
| 7,213,211 | B1 | * | 5/2007 | Sanders et al. ................ 715/753 |
| 7,697,040 | B2 | * | 4/2010 | Sorensen et al. ............ 348/231.2 |
| 7,765,487 | B2 | * | 7/2010 | Cable ............................ 715/764 |
| 2002/0016800 | A1 | * | 2/2002 | Spivak et al. ................. 707/523 |
| 2007/0011607 | A1 | * | 1/2007 | Lazareck et al. .............. 715/530 |

* cited by examiner

*Primary Examiner* — Pavan Mamillapalli
(74) *Attorney, Agent, or Firm* — Bacon & Thomas, PLLC

(57) ABSTRACT

A network digital creation system and the method thereof are disclosed. The client end executes a web page document embedded with a web page procedure in order to initialize the drawing block in the web page document and to allow the user to directly use the cursor to draw. It further enables the user to use quote images previously stored in the server end or the quote the graphic resources in the external network for drawing. After finishing the plot, the user stores the result to the server end to become a quote image. It can be shared to other users by quoting. This facilitates the interactions of network digital creations.

22 Claims, 15 Drawing Sheets

NETWORK DIGITAL CREATION SYSTEM AND METHOD THEREOF

BACKGROUND

The invention relates to a network digital creation system and the method thereof. In particular, the invention pertains to a network digital creation system that enables the user to create and share quote images in network browsers for digital creations and the method thereof.

In recent years, with the popularity of computers and rapid development in Internet, many applications, such as computer graphing, in real life have been combined with computers. Therefore, application software or service for the use to perform digital creations is invented.

Generally speaking, common digital creations include high-level computer graphing and electronic whiteboard for graffiti. These two can both enable users to perform digital creations on a computer platform. They only differ in functions. They are also designed for different user groups. However, the computer graphing involves higher learning threshold. Therefore, only the electronic whiteboard is more popular to the general public. However, the electronic whiteboard also cannot satisfy the needs of most users because it does not allow the user to share with others over the Internet. It does cannot use the creation results of others to make further creations.

Therefore, some manufacturers propose electronic whiteboard with more functions. For example, one can combine the instant messenger and the electronic whiteboard to increase the interactions between different users during creation activities. However, the above-mentioned method can only provide instant communications for both parties to interface, instead of storing the digital creation result. Moreover, the creation results cannot be publicly shared via a network platform for other users to browse and use. Therefore, the interactivity of the user's creations is still insufficient and needs to be improved.

In summary, the prior art always has the problem of being unable to effectively increase the interactivity of digital creations. It is thus imperative to provide a better solution.

BRIEF DESCRIPTION OF THE DRAWINGS

The invention will become more fully understood from the detailed description given herein below illustration only, and thus is not limitative of the invention, and wherein.

DETAILED DESCRIPTION

Figure 1:
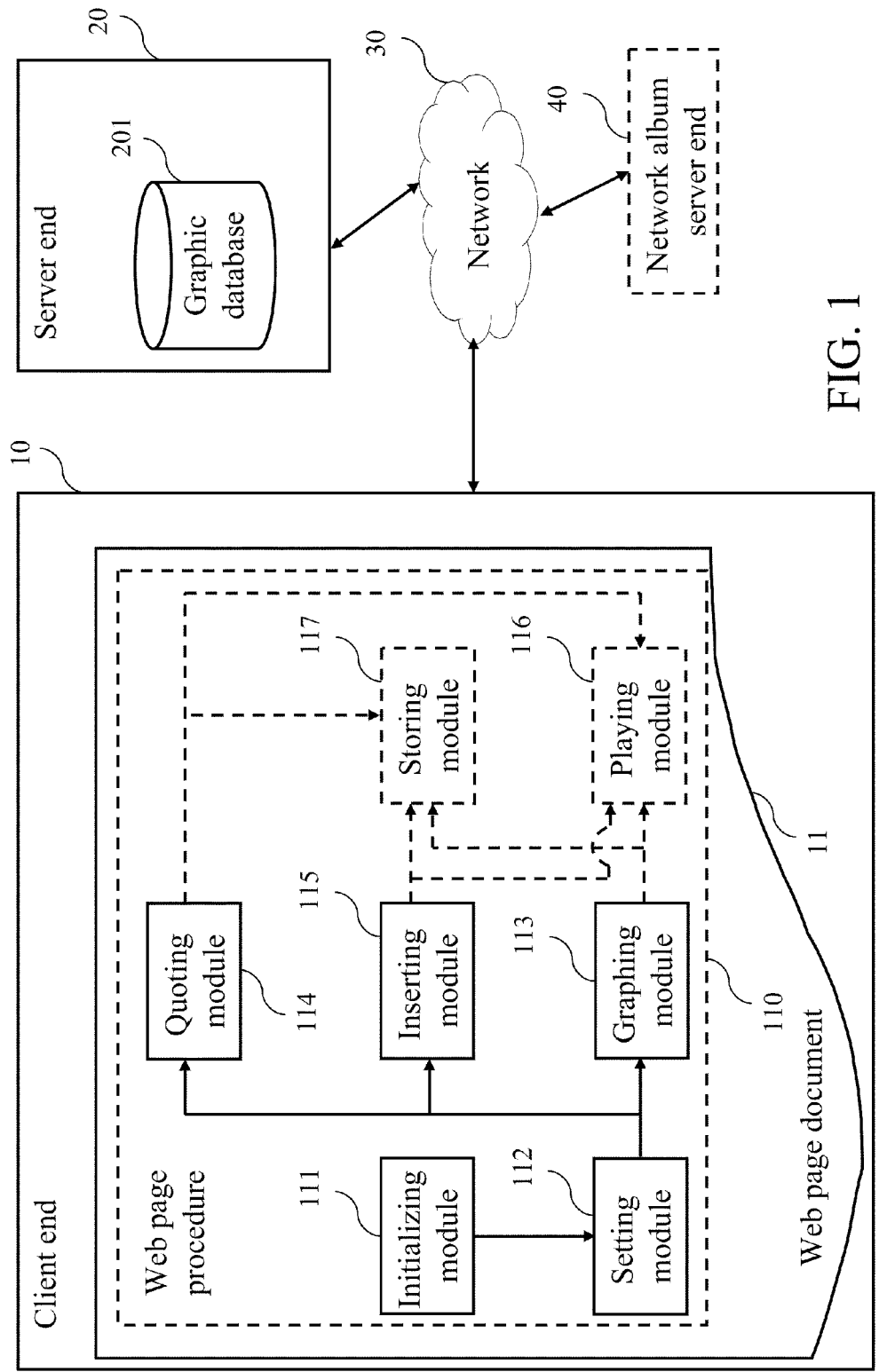
FIG. 1 is a system block diagram of the disclosed network digital creation system.

The invention will be apparent from the following detailed description of embodiments and examples that proceeds with reference to the accompanying drawings, wherein the same references relate to the same elements.

In the following description, numerous specific details are set forth in order to provide a thorough understanding of the invention. However, it will be apparent to one skilled in the art that the invention can be practiced without these specific details. In other instances, well known software module or components, circuits, components, algorithms, and processes have not been shown in detail or have been illustrated in schematic or block diagram form in order not to obscure the invention in unnecessary detail. Additionally, for the most part, details concerning communication systems, transmitters, receivers, communication devices, and the like have been omitted inasmuch as such details are not considered necessary to obtain a complete understanding of the invention and are considered to be within the understanding of persons of ordinary skill in the relevant art. It is further noted that, where feasible, one or more functions described herein may be performed in either hardware, software, firmware, analog components or a combination thereof, unless indicated otherwise. Certain term are used throughout the following description and Claims to refer to particular system components. As one skilled in the art will appreciate, components may be referred to by different names. This document does not intend to distinguish between components that differ in name, but not function. In the following discussion and in the Claims, the terms "including" and "comprising" are used in an open-ended fashion, and thus should be interpreted to mean "including, but not limited to . . . "

Embodiments of the invention are described herein. Those of ordinary skill in the art will realize that the following detailed description of the invention is illustrative only and is not intended to be in any way limiting. Other embodiments of the invention will readily suggest themselves to such skilled persons having the benefit of this disclosure. Reference will be made in detail to implementations of the invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In view of the foregoing, the invention discloses a network digital creation system and the method thereof.

In one embodiment, a system is provided that includes server end and a client end. The server end stores web page documents and a graphic database. The graphic database stores quote images, each of which includes quote graphic information.

In one embodiment, the client end downloads the web page documents from the server end and executes the web page procedure embedded therein. The web page procedure includes: an initializing module, a setting module, a plotting module, a quoting module, and an inserting module. The initializing module initializes a graphing buffer, a graphing block, a selecting block, and a searching block. The setting module sets graphing parameter via the selecting block, and sets a loading condition and a loading parameter via the searching block. The graphing module generates real-time graphic information according to the graphing parameter and cursor operation. The real-time graphic information is added in sequence to the graphing buffer. A first graphic element is generated or adjusted according to the real-time graphing message for display. When the loading condition is a quote, the quoting module generates a quote element tag corresponding to the loading parameter and appends it to the graphing buffer. It further loads the quote graphic information contained in the quote image according to the quote element tag from the graphic database and adds the quote graphic information in sequence to the graphing buffer. A second graphic element is generated according to the quote graphic information for display. When the loading condition is insertion, the inserting module generates a media element tag embedded with the loading parameter. The media element tag is appended to the graphing buffer. A network image is loaded according to the media element tag as the media image information. The media image information is stored in the graphing buffer. A third graphic element is formed according to the media image information for display.

In one embodiment, a method is provided for use in a network or similar system. In one embodiment, the method may be applied to a network environment with a client end and a server end. The method may include storing web page documents on the server end and providing quote images in the graphic database of the server end, each of the quote images including quote graphic information; downloading a web page document by the client end from the server end and executing the web page procedure embedded therein; initializing a graphing buffer, a graphing block, a selecting block, and a searching block; setting a graphing parameter via the selecting block; generating real-time graphing information in the graphing block according to the graphing parameter and cursor operation, appending in sequence the real-time graphing information to the graphing buffer, and generating or adjusting a first graphic element according to the real-time graphing message for display; setting a loading condition and the loading parameter via the searching block; when the loading condition is quote, generating a quote element tag according to the loading parameter and appending it to the graphing buffer, loading the quote graphic information contained in the quote image from the graphic database according to the quote element tag, appending the quote graphic information in sequence to the graphing buffer, and generating a second graphic element according to the quote graphic information for display; when the loading condition is an insertion, generating a media element tag embedded with the loading parameter, appending the media element tag to the graphing buffer, loading a network image according to the media element tag as media image information, storing the media image information in the graphing buffer, and generating a third graphic element according to the media image information for display.

According to one embodiment, the disclosed system and method are provided that differ from the prior art in that the client end executes a web page document embedded with a web page procedure. The graphing block in the web page document is initialized for the user to use the cursor for plotting. It further enables the user to quote images previously stored on the server end or to insert an external network image for further plotting. After the user finishes plotting, the graphic result can be stored to the server as a quote image. It can then be shared to other users by quoting. The disclosed technique can enhance the interactivity of the network digital creations.

Before describing the disclosed system and method, it is appropriate to first explain the terms defined in the specification. The quote image referred herein includes quote graphic information and can be presented in graphics according to the quote graphic information. The quote graphic information is compliant with the standards of Extensible Markup Language (XML). The quote images are stored in the graphic database of the server end. They are usually stored in advance or the XML stored after the user finishes plotting. The graphing buffer refers to the memory space temporarily holding the plot during the graphing process. It is generated after the client end executes the web page procedure and completes the initialization. It temporarily stores data during the graphing process. After the user finishes plotting, the result is immediately stored. The contents in the graphing buffer, such as real-time graphing information, quote element tag, or media element tag, will be sent to the server end and stored as a quote image. The graphing buffer releases the memory space after the web page procedure ends. In practice, the graphing buffer uses different memory blocks to store the quote element tag, quote graphic information, real-time graphing information, and media element tag compliant with the XML standards as well as the media image information. It should be noted that the reason only the real-time graphing information, the quote element tag or media element tag in the graphing buffer are stored as the quote image is to save memory space and to avoid impinging on copyrights.

Moreover, the quote graphic information and real-time graphic information include at least one parameter of stroke path, deformation, rotation, stamp, color, size, transparency, ID number, ID code, background, and storage position. The quote graphic information and real-time graphic information only differ in that the quote graphic information is previously stored in the graphic database, while the real-time graphic information is generated while plotting. The media element tag is used for inserting an external network image. It includes at least one parameter of ID number, size, web address of the network image, etc. The quote element tag is used to quote the quote image stored on the server end, and include at least one parameter of ID number, ID code, size, etc. It should be particularly mentioned that the quote graphic information, real-time graphic information, quote element tag, and media element tag are compliant with the XML standards. They will be explained in further detail with reference to accompanying drawings.

FIG. 1 shows a system block diagram of one embodiment of a novel network digital creation system. The exemplary system may include a client end 10, a server end 20, and a network 30. The client end 10 and the server end 20 communicate and exchange data via the network 30. In practice, the client 10 can further download a network image from a network album server 40 (e.g., Flickr, Picasa, etc) via the network 30. The downloading method will be explained below.

The server 20 stores a web page document (not shown) for the client end 10 to download for browsing and executing. The server end 20 includes a graphic database 201. The graphic database 201 stores quote images, each of which includes quote graphic information. Since the quote image has been defined before, it is not further described here. It should be mentioned that the graphic database 201 can be a relational database. It allows one to use a structured inquiring language to edit and delete the quote images stored therein.

The client end 10 downloads the web page document 11 from the server end 20 via the network 30, and executes the web page procedure 110 embedded therein. In fact, the client end 10 can be viewed as a browser to browse the web page document 11. The web page procedure 110 includes: an initializing module 111, a setting module 112, a graphing module 113, a quoting module 114, and an inserting module 115. The initializing module 111 initializes a graphing buffer, a graphing block, a selecting block, and a searching block. The graphing buffer stores the plotting information generated as the user operates in the graphing block (i.e., the real-time graphic information). Since the graphing buffer has been described before, it is not repeated hereinafter. The graphing block is an operating area for the user to plot. The selecting block provides necessary plotting tools, such as pens, lines, stamp, etc, for the user to select. The searching block enables the user to search and quote/insert other quote images or network images. In practice, the selecting block can include the tool selection of pens, lines, stamps, deformations, and backgrounds. After the user selects one of them, the settings of the corresponding tool can be further modified. The setting details will be described below with accompanying drawings.

The setting module 112 receives the graphing parameters set by the user in the selecting block, and receives the input of the user in the searching block to set the loading condition and the loading parameter. As mentioned above, in one embodiment the selecting block may contain such tools as pens, lines, stamps, deformations, clear, backgrounds. After one of them is selected, the corresponding settings are prompted for setting the graphing parameter. For example, suppose the user selects the "pen". The selecting block further provides the settings for the "pen", such as transparency, size, etc for the user to make further modifications. The setting module 112 combines the above setting to a graphing parameter. The loading condition may include quote and insertion, meaning that the user wants to quote a quote image in the graphic database 201 or to insert a network image stored in a network album server 40. The loading parameter includes at least one of storage position, ID code, web address, etc. For example, it includes ID code of the quote image or web address of the network image. In practice, the searching block also allows the user to input a search condition on the client end 10. This search condition is then used to find a quote image in the graphic database 201 on the server end 20. The quote image is displayed in the searching block on the client end 10. There may be more than one quote images. After the user selects the required quote image, the setting module 112 sets the ID code of the quote image as the loading parameter.

The graphing module 113 performs plotting and generates the real-time graphic information according to the graphing parameter set in the graphing block and the cursor operation of the user. The real-time graphic information is appended in sequence to the graphing buffer. A first graphic element is generated or adjusted according to the real-time graphic information for display. For example, suppose the graphing parameter is set as "pen; color: 240; transparency 1: size 5". Then the user operates in the graphing block using the cursor and generates the real-time graphic information, such as "<Pen id="i_1" ix="−79" iy="2" b="5" c="240" a="1" ox="165" oy="91"></Pen>". Here "Pen" represents a pen brush; "id" represents an ID number; "ix" and "iy" represent the initial coordinates of the plot, respectively. "b" represents the size, "c" represents the color, and "a" represents the transparency. "ox" and "oy" represents the "x-axis" and "y-axis" of the central coordinate. Afterwards, the first graphic element is generated or adjusted according to the real-time graphic information in the graphing block and displayed. At the same time, the real-time graphic information is appended to the graphing buffer. The first graphic element is a vector graph.

In practice, the real-time graphic information can further includes the pen path, such as "<p px="−79" py="1"/>". Here, "p" represents the pen path, and "px" and "py" represent the coordinates of the pen path. In other words, when the user draws a line from the coordinate (−79,1) vertically downward within the graphing block to the coordinate (−49,1), the real-time graphic information includes in sequence "<p px=−79" py="1" />", "<p px="−77" py="1" />", "<p px="−75" py="1" />", ..., and "<p px="−49" py="1" />". It should be noted that even though this specification uses the above example to explain the real-time graphic information and the recoding format of the pen path, the invention does not impose any restriction on the real-time graphic information and the pen path.

When the user selects to load a quote image from the graphic database 201, the quoting module 114 sets the loading condition as the quote. The quoting module 114 generates the corresponding quote element tag according to the loading parameter set in the searching block, such as "<QArt...>...</QArt>". It is then appended to the graphing buffer. The quote graphic information contained in the quote image is then loaded from the graphic database 201 according to the quote element tag and appended in sequence to the current graphing buffer. The second graphic element is then generated according to the quote graphic information and displayed. For example, suppose the loading condition is quote. The quote element tag is generated according to the ID code of the loading parameter (e.g., numerical value "4") such as "<QArt id="i_1" qid="4"...>...</QArt>", where "QArt" is the identification name of the quote element tag, "id" is the ID number of the quote element tag, and "qid" is the ID code of the quote graphic information. The quote image is loaded from the graphic database 201 according to "qid" in the quote element tag (in the XML format). The quote image includes the quote graphic information such as "<Pen ... > ... </Pen>". The quoting module 114 directly appends the quote graphic information contained in the quote image to the graphing buffer. The second graphic element is then generated according to the quote graphic information in the graphing buffer and displayed in the graphing block. In practice, the second graphic element is either a vector graph or a dot-matrix graph. It should be mentioned that when the quote graphic information "<Pen ... > ... </Pen>" is appended to the graphing buffer, it is contained in the tags "<Quote qid="4"...>" and "</Quote>". The value of "qid" is the same as the number of "qid" in the corresponding quote element tag. Besides, when the user repeatedly selects to load the same quote image, the corresponding number of quote element tags is generated as well. However, the quote graphic information is only loaded once. Each of the quote element tags has a different ID number (i.e., "id").

When the user uses the searching block to select to load a network image, the inserting module 115 sets the loading condition as insertion. The inserting module 115 generates the media element tag embedded with the loading parameter (also set via the searching block) and appends the media element tag to the graphing buffer. The network image is then loaded according to the media element tag as the media image information, which is then stored in the graphing buffer. (That is, the network image is only temporarily stored in memory.) The third graphic element is generated according to the media image information and displayed in the graphing block. As mentioned before, the setting module can set the loading condition and the loading parameter via the searching block. Suppose the loading condition is set as insertion and the loading parameter is set as a web address, such as "http://a.b.c/a.jpg". The inserting module 115 then generates the media element tag embedded with the loading parameter, such as "<Media id="i_6" url="http://a.b.c/a.jpg" ... > ...

</Media>". Here "Media" is the identification name of the media element tag, and "id" and "url" represent the ID number of the media image information and the web address of the inserted network image, respectively. The media element tag thus generated is appended to the graphing buffer. Afterwards, the inserting module 115 follows "url" in the media element tag to load the network image (whose filename is "a.jpg") as the media image information (e.g., the "binary data" of "a.jpg"). The media image information is stored in the graphing buffer. The third graphic element is generated according to the media graphic information and displayed. In practice, the third graphic element is either a vector graph or a dot-matrix graph according to the loaded network image. That is, if the network image is a vector graph (e.g., a flash multimedia file with the sub filename SWF), then the third graphic element generated by the inserting module 115 is also a vector graph. On the other hand, if the network image is a dot-matrix graph (e.g., a picture file with the sub filename JPG, GIF, etc), then the third graphic element generated by the inserting module 115 is also a dot-matrix graph. It should be noted that the above-mentioned quoting module 114 and inserting module 115 can be used in turns or individually according to the user's operations. There is no limit of the number of use times. Besides, when the user repeatedly selects the same network image to load, the corresponding number of media element tags is generated. But the network image is only loaded once as the media graphic information in order to save memory space. Each of the media element tags has a different ID number (i.e., "id").

Moreover, the web page procedure 110 can further includes a playing module 116 and a storing module 117. After the user uses the cursor to click a playing element (e.g., a button or icon) provided on the web page, the playing module 116 generates or adjusts the first graphic element, the second graphic element, and the third graphic element according to the real-time graphic information, the quote element tag and quote graphic information, or the media element tag and media graphic information and plays them in a graphing area. In practice, the graphic information (including quote and media), the element tag (including quote and media), and the media image information can be temporarily stored in different memory sectors of the graphing buffer. They can even be stored in a temporary document, such as "temp.xml" to save memory space. This then produces an animation effect for the digital creations. It should be mentioned that since the same quote image or network image is quoted or inserted b the user two or more times, the graphing buffer only stores one copy of the quote graphic information or media image information. Therefore, in addition to saving memory space, the invention also greatly increases the processing efficiency.

After the user uses the cursor to click the storing element (e.g., button or icon) provided on the web page, the storing module 117 transmits all the contents in the graphing buffer (possibly including real-time graphic information, quote element tag or media element tag) to the graphic database 210 on the server end 20 as the quote images. That is, once the user on the client end 10 finishes plotting, the storing module 117 stores the plotting result to the graphic database 201 on the server end 20 of other users to browse or quote. It should be noted that when the playing module 116 plays the first graphic element, the second graphic element, or the third graphic element, the user is allowed to control the fraction of the displayed contents using a time axis provided in the web page document. The user can even set the speed parameter using a setting button in the web page document, and use the speed parameter to control the display speed of the above-mentioned graphic elements. For example, suppose the graphing buffer stores ten sets of real-time graphic information. Using the time axis, one can assign one of the ten sets of real-time graphic information as the starting point and play them in sequence to the last one. The speed parameter can be set as the number of sets of real-time graphic information that are played per second. For example, playing ten sets of real-time graphic information per second is considered as high display speed, and playing one set of real-time graphic information per second is considered as low display speed.

Figure 2A:
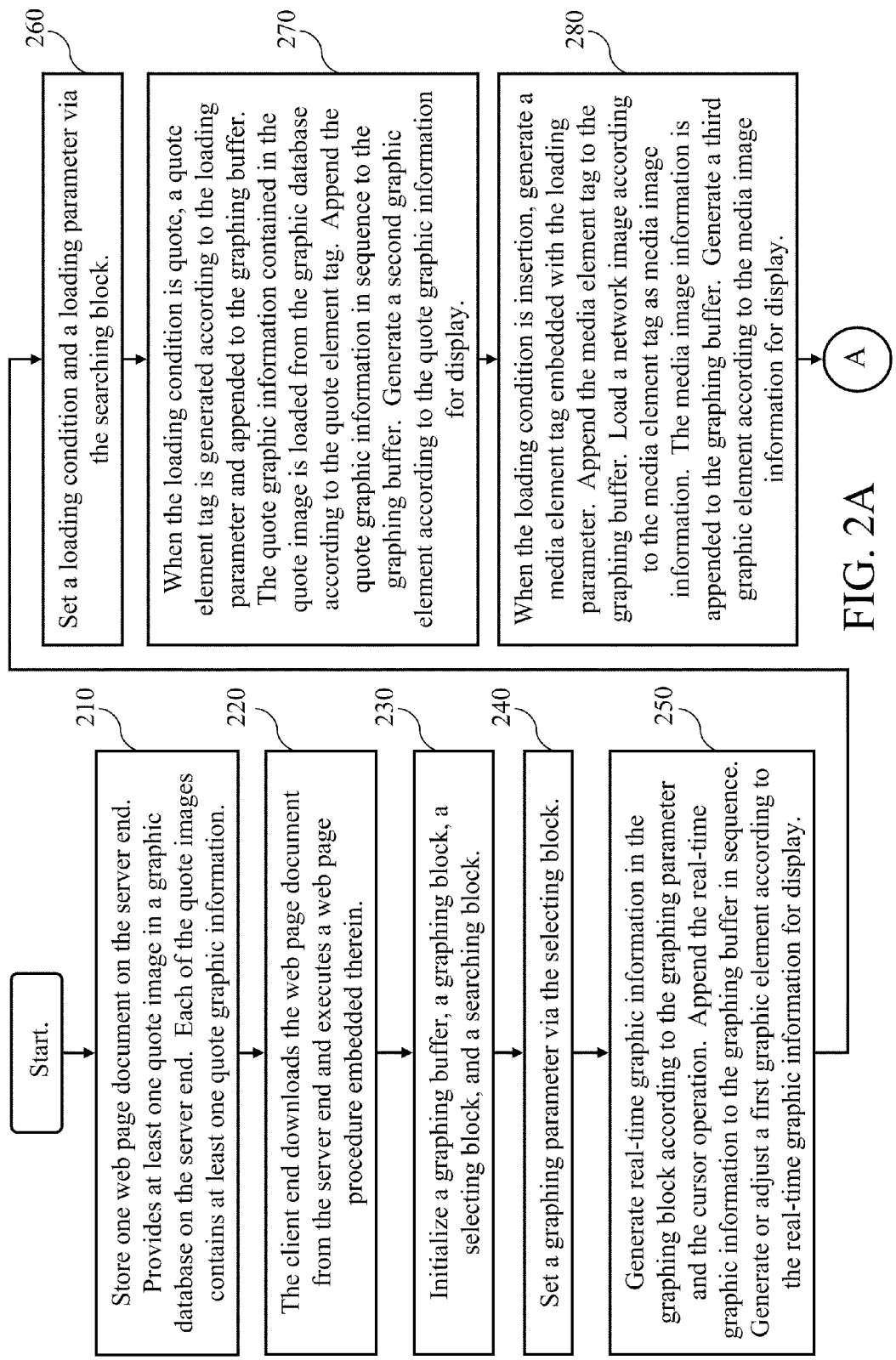
FIGS. 2A and 2B are flowchart of the disclosed network digital creation method.
Figure 2B:
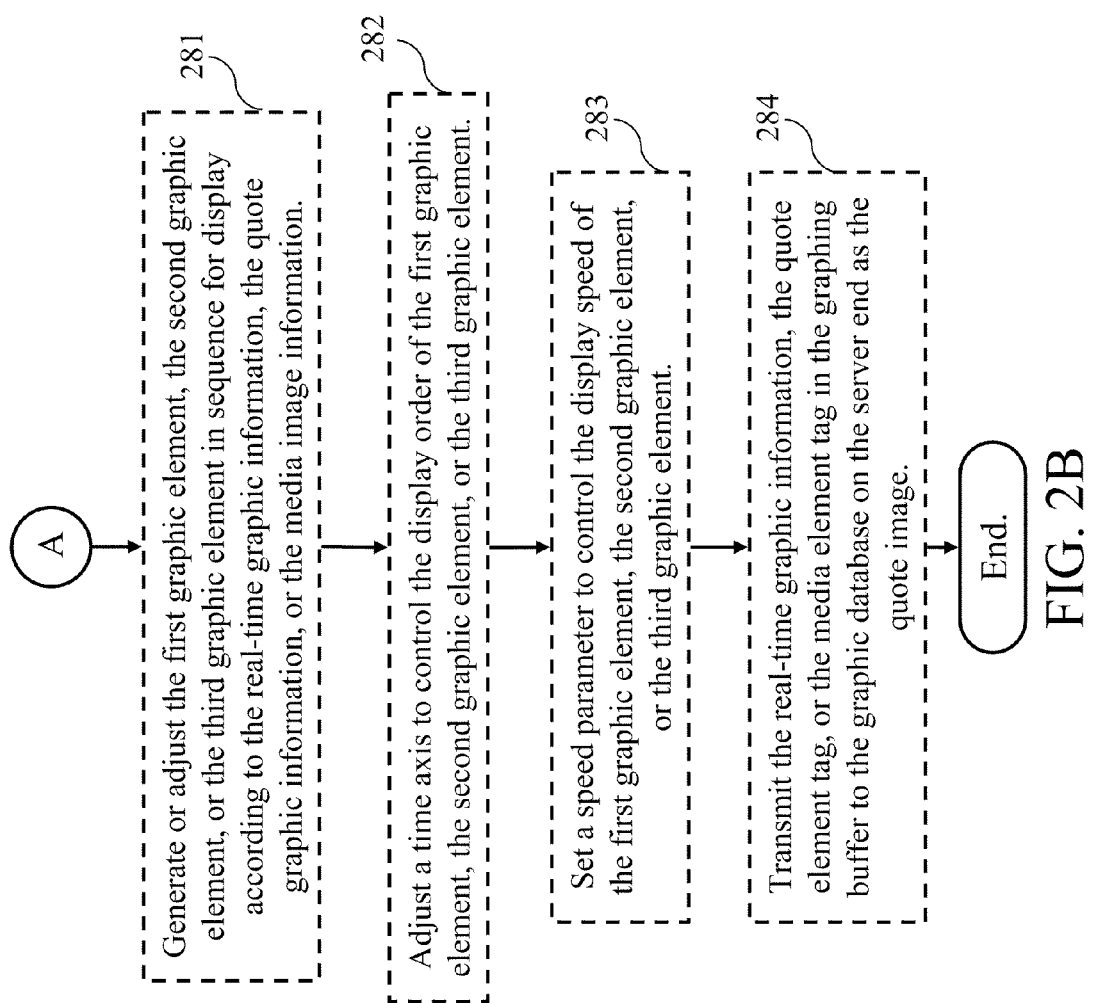
Figure 3:
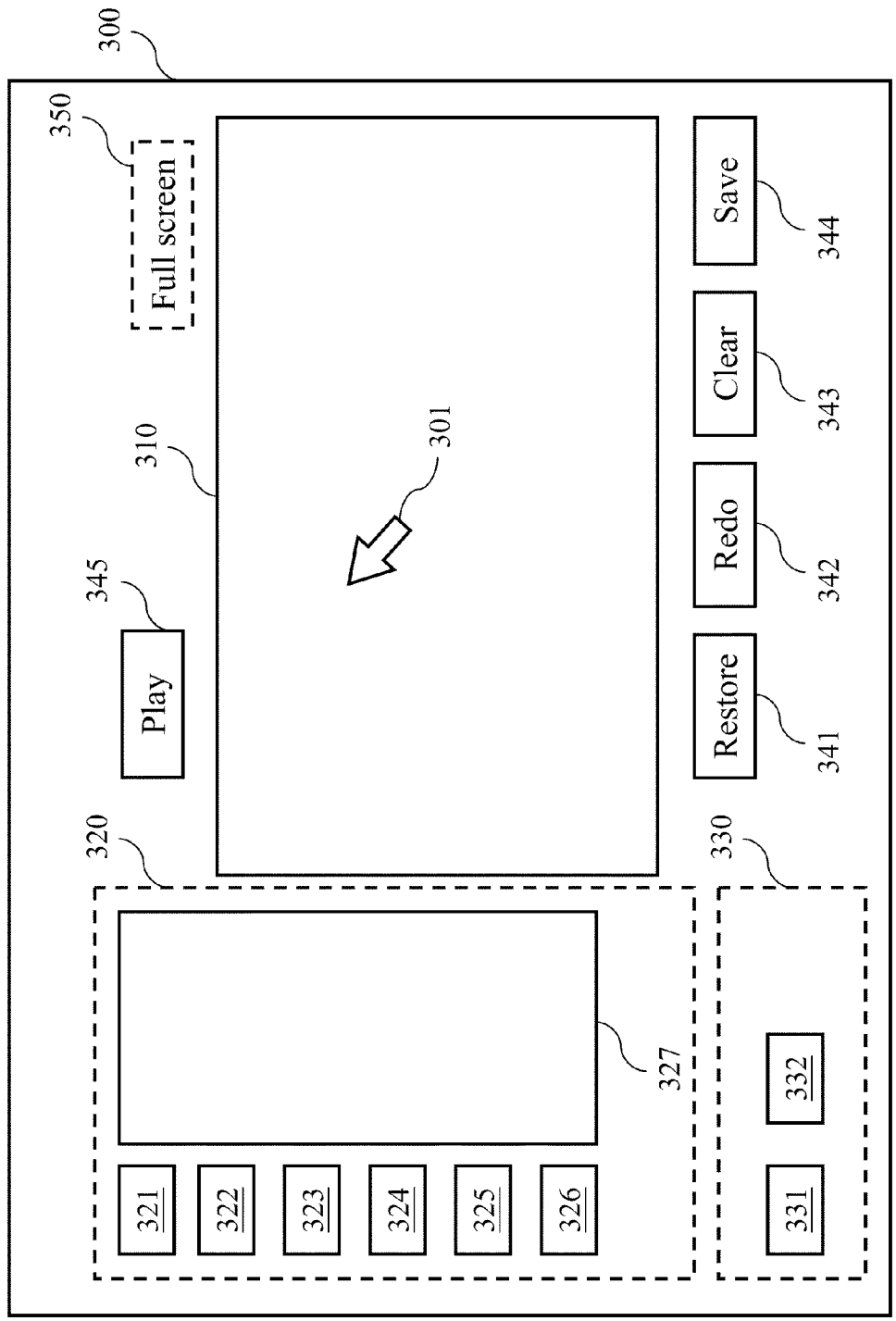
FIG. 3 is a schematic view of the creation interface according to the invention.

FIGS. 2A and 2B are flowcharts of an example of a novel method of network digital creations. The method includes the following steps. In step 210, the server end stores a web page document, and the graphic database on the server end provides quote images, each of which includes quote graphic information. In step 220, the client end downloads the web page document from the server end and executes the web page procedure embedded therein. Step 230 initializes a graphing buffer, a graphing block, a selecting block, and a searching block. Step 240 sets a graphing parameter via the selecting block. In step 250, real-time graphic information is generated according to the graphing parameter and cursor operation in the graphing block. The real-time graphic information is appended in sequence to the graphing buffer. A first graphic element is generated or adjusted according to the real-time graphic information and displayed. Step 260 sets a loading condition and a loading parameter via the searching block. In step 270, when the loading condition is quote, a corresponding quote element tag is generated according to the loading parameter and appended to the graphing buffer. The quote graphic information contained in the quote image is loaded from the graphic database according to the quote element tag. The quote graphic information is appended in sequence to the graphing buffer. A second graphic element is generated according to the quote graphic information and displayed. In step 280, when the loading condition is insertion, the media element tag embedded with the loading parameter is generated and appended to the graphing buffer. The network image is loaded according to the media element tag as the media image information. The media image information is stored in the graphing buffer. A third graphic element is generated according to the media image information and displayed. It should be mentioned that step 270 and step 280 are selectively executed according to the loading condition set by the user in the searching block.

Through the above-mentioned steps, the client end 10 executes the web page document 11 embedded with the web page procedure 110 in order to initialize the graphing block in the web page document 11 and to allow the user to plot using the cursor directly. The user can quote the quote images previously stored in the server end 20 or quote image resources in an external network (a network album server 40) for further plotting. After the user finishes plotting, the result is stored in the server end as a quote image, which is then shared to other users by quoting.

After step 280, the quote graphic information, real-time graphic information, or media image information in the graphing buffer is used in sequence to generate or adjust the corresponding first graphic element, the second graphic element, or the third graphic element for playing in step 281. Step 282 allows the user to adjust the time axis in order to control the display order of the first graphic element, the second graphic element, or the third graphic element. Step 283 sets the speed parameter and uses the speed parameter to control the first graphic element, the second graphic element, or the third graphic element to generate or adjust the display speed. Step 284 transmits the real-time graphic information, quote element tag, or media element tag in the graphing buffer to the graphic database on the server end as the quote image. Through step 281, the user can understand the detailed graphing procedure from the animation playing. Steps 282 and 283 control the display order and speed of the graphic elements. Step 284 stores the plot made by the user on the client end 10 in the graphing block via the network to the graphic database 201 on the server end 20 for other users to browse or quote.

An example of an embodiment of the invention is explained below, with reference to FIGS. 3 to 6. Please first refer to FIG. 3, which is a schematic view of the creation interface in a network digital creation system. The creation interface includes: a cursor 301, a graphing block 310, a selecting block 320, a pen element 321, a line element 322, a stamp element 323, a deformation element 324, a clear element 325, a background element 326, a setting element 327, a searching block 330, an internal quote 331, an external insertion 332, a restoring element 341, a redo element 342, a clear element 343, a storing element 344, a playing element 345, and a full-screen element 350. It should be emphasized that the invention does not restrict the number and type of the elements in the creation interface 300.

When the user wants to perform a digital creation (i.e., making a plot), he can download the web page document 11 from the server end 20 to the client end 10 via the network. The web page procedure 110 embedded in the web page document 11 is then executed to open the creation interface 300. At this moment, the initializing module 111 initializes the graphing buffer, the graphing block 310, the selecting block 320, and the searching block 330. The initialization establishes a graphing buffer for uses during the graphing process. For example, it defines memory space or establishes a temporary document "temp.xml". It also displays the graphing block 310, the selecting block 320, and the searching block 330. After the initializing module 111 finishes the initialization, the user on the client end 10 is allowed to draw via a web page browser.

Figure 4A:
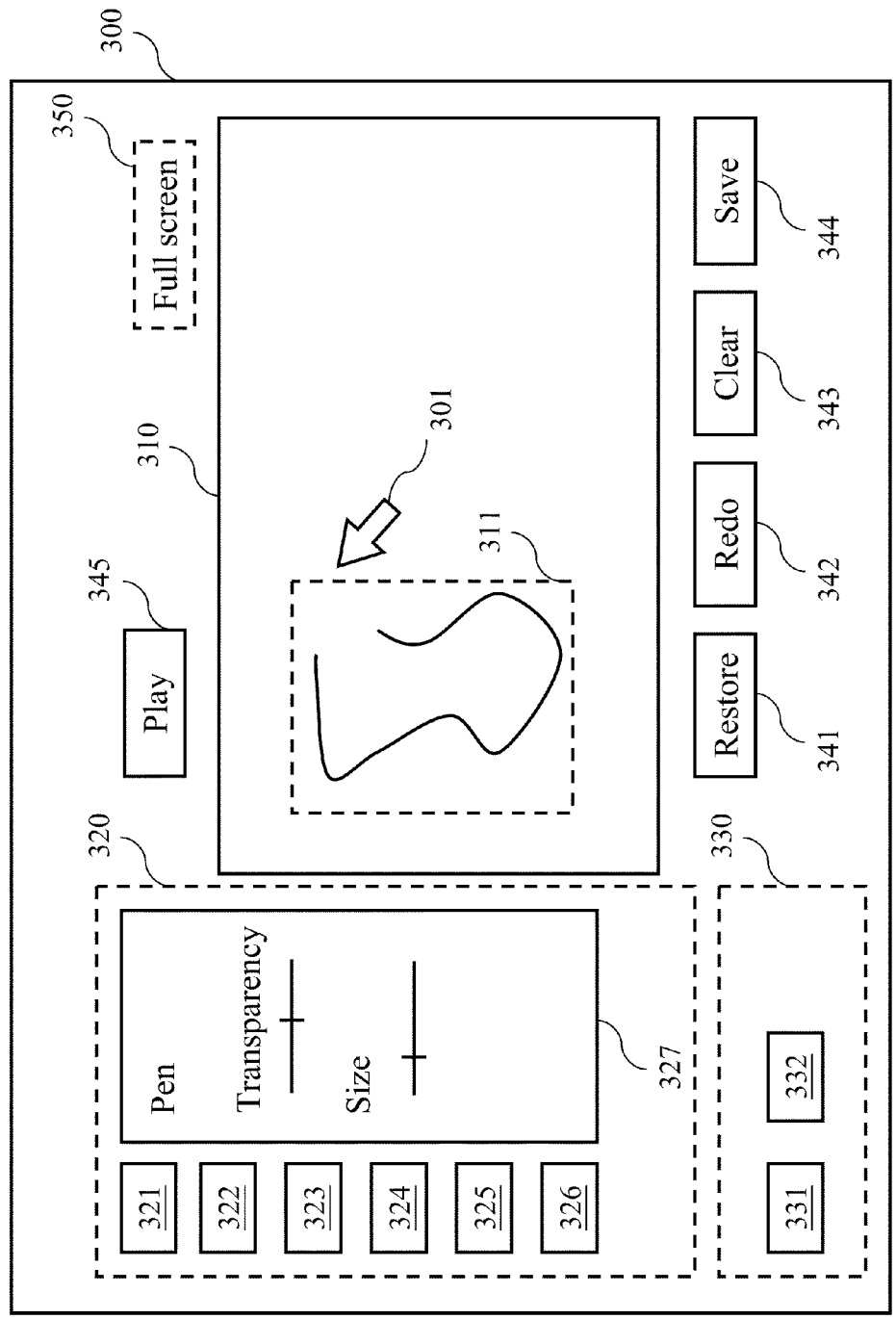
FIGS. 4A to 4G are schematic views of drawing according to the invention.
Figure 4B:
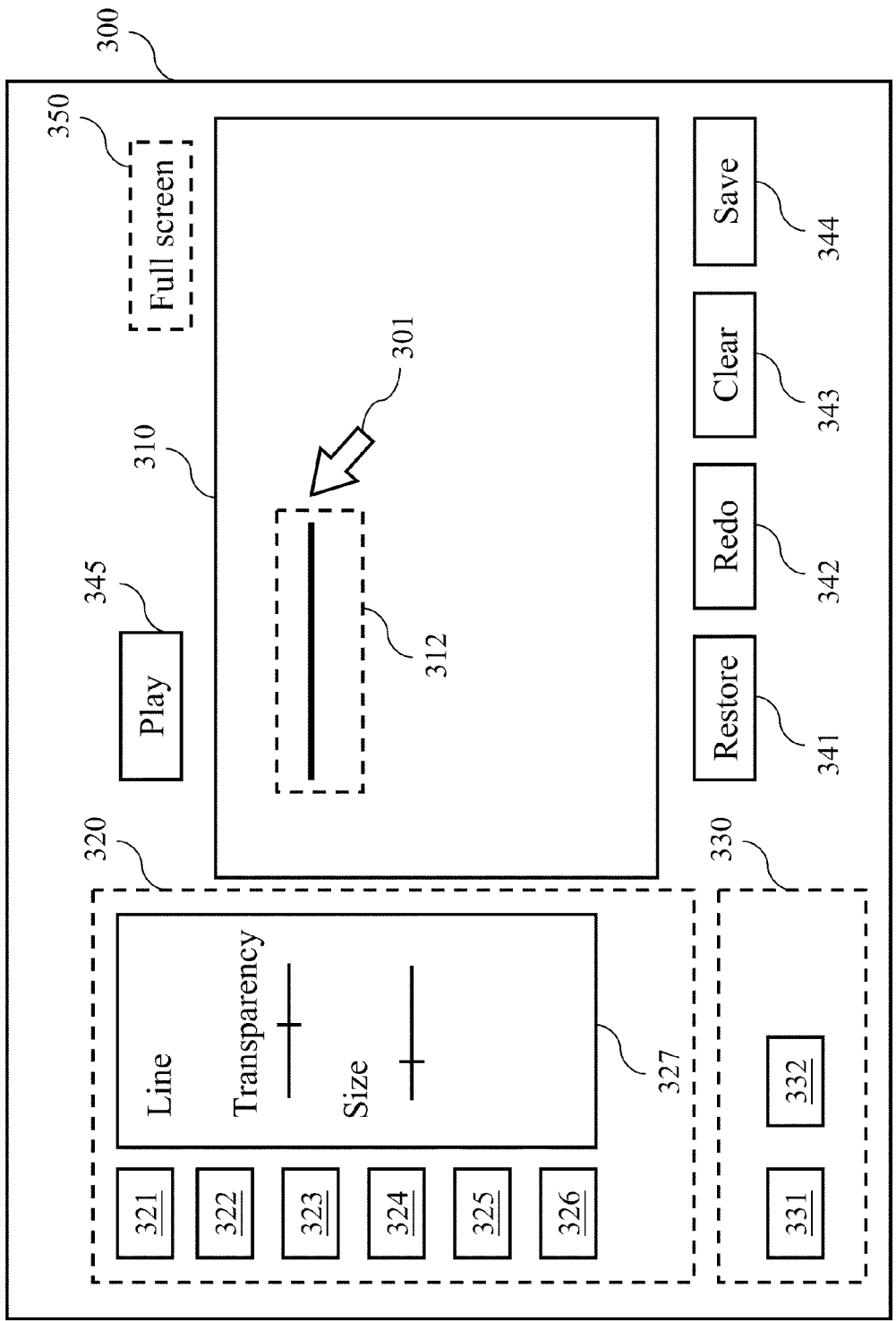

FIGS. 4A to 4G are schematic views illustrating an example of making a plot. As mentioned before, the user is allowed to draw after the initializing module 111 finishes the initialization. In this case, the user can use the cursor 301 to draw in he graphing block 310. For example, the user can use the cursor 301 to click the pen element 321 in the selecting block 320, and further sets the transparency and size through the setting element 327 (e.g., the transparency is set as "1" and the size as "5"). In this case, the setting module 112 uses the user's settings as the graphing parameter. Afterwards, the user moves the cursor 301 into the graphing block 310. When the user presses the left button of the mouse and drags and then releases it, the graphing module 113 follows the cursor operation and graphing parameter done by the user in the graphing block 310 to generate the real-time graphic information. The real-time graphic information is then used to generate the first graphic element 311, as shown in FIG. 4A, for display. The real-time graphic information is appended to the graphing buffer.

After selecting the line element 322, the user can also set the transparency and size using the setting element 327 (e.g., transparency as "1" and size as "5"). As the user presses the left button of the mouse in the graphing block 310 and drags horizontally and then release it, the corresponding real-time graphic information is generated to render the first graphic element 312 shown in FIG. 4B. Take the generated real-time graphic information as an example. Suppose the position of the cursor 301 when the left button of the mouse is pressed has the coordinate (5,5). After the cursor is horizontally dragged and then the left button of the mouse is released, the cursor 301 reaches the position of coordinate (10,5). In this case, the real-time graphic information generated by the graphing module 113 is, for example, "<Line id="i_1" ix="5" iy="5" b="5" a="1" . . . > . . . </Line>", where "Line" represent a line, "id" represents the ID number, "ix" and "iy" represent the initial coordinate values (5,5) of the drawing. Afterwards, the graphing module 113 generates a first graphic element 312 according to the real-time graphic information. It should be noted that in practice, the first graphic elements 311, 312 are vector graphs.

Figure 4C:
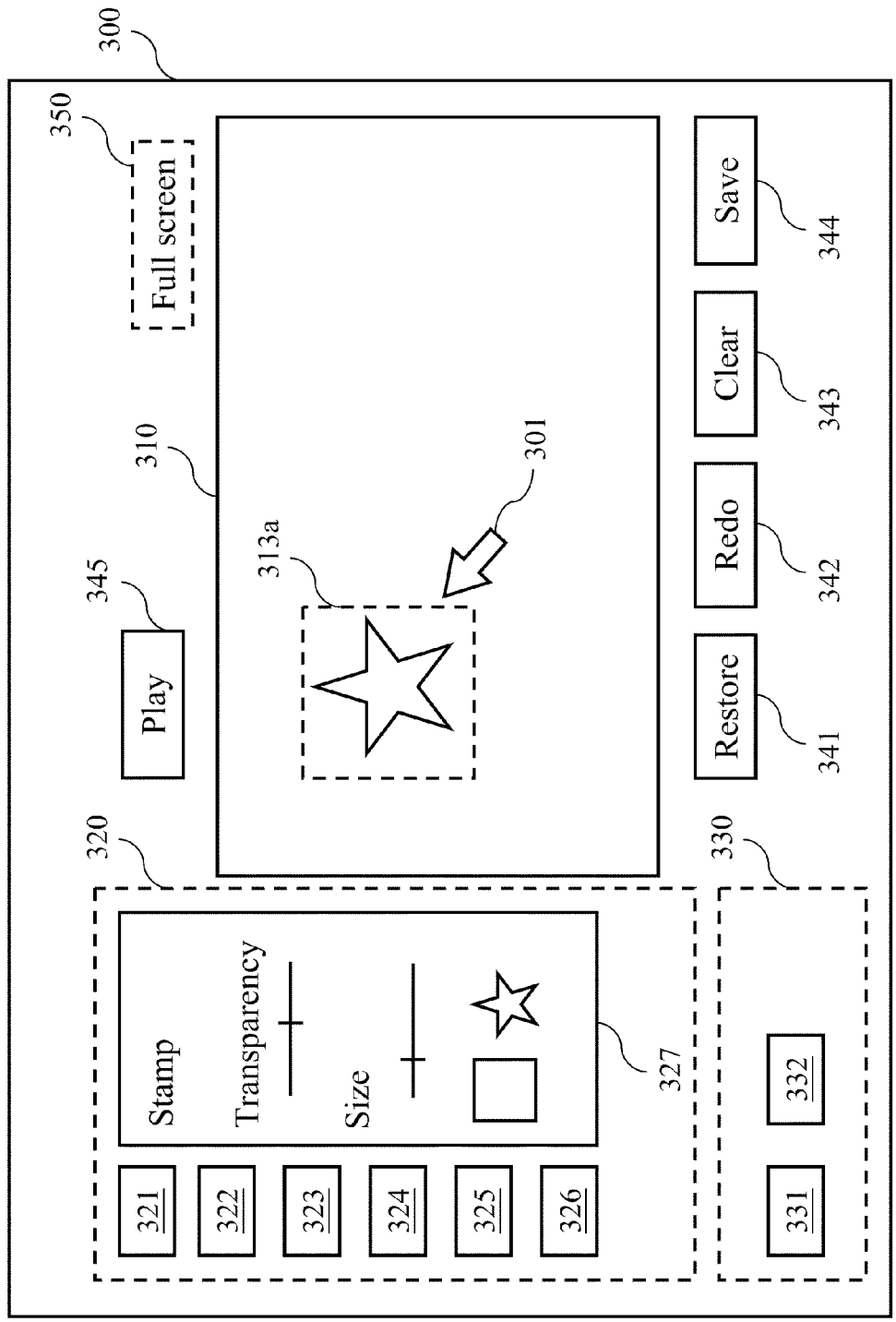
Figure 4D:
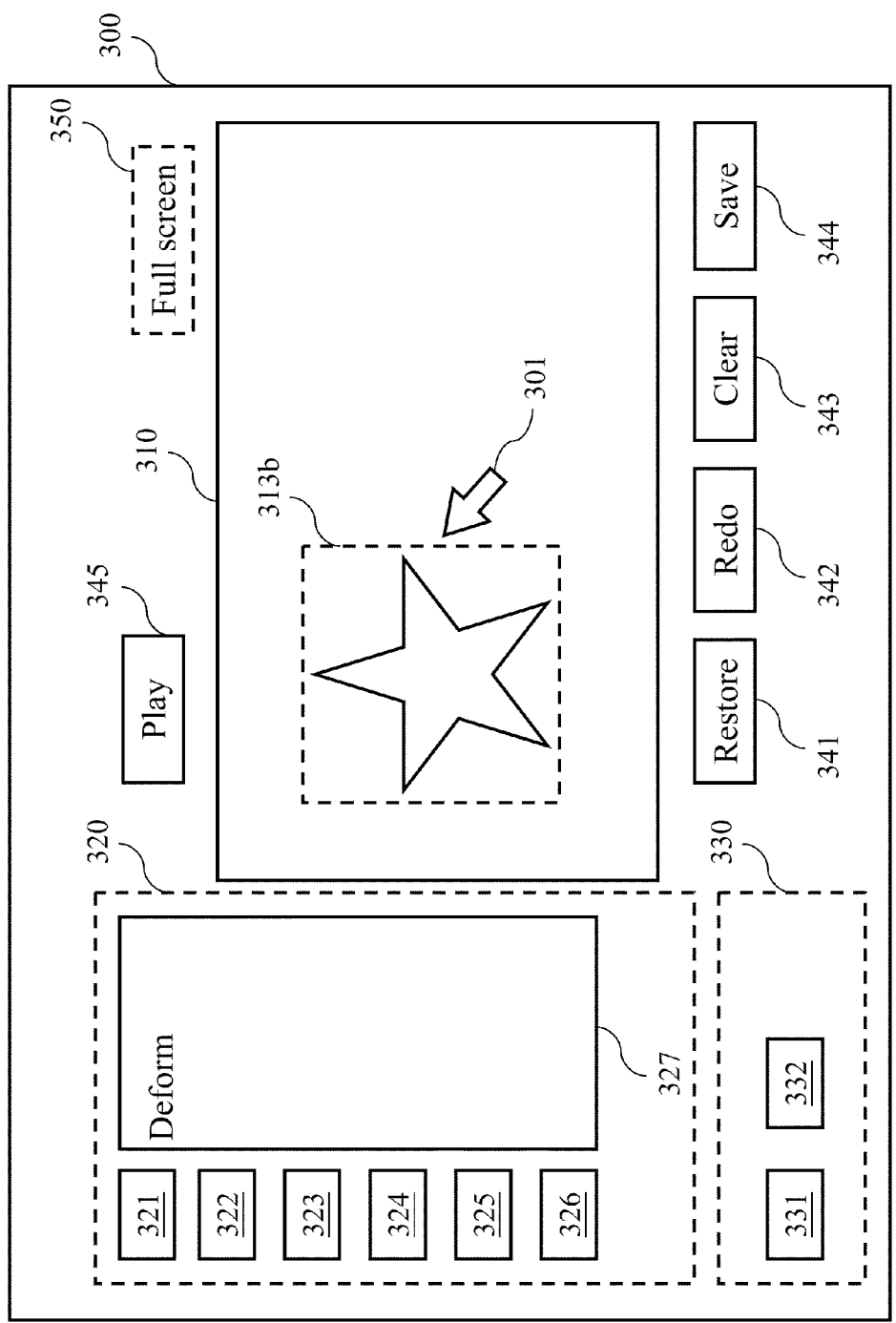

After the user clicks the stamp element 323, he can also use the setting element 327 to perform advanced settings (e.g., using the cursor 301 to click "star" as the assigned stamp). The setting is then used as the graphing parameter. After manipulating the cursor 301 in the graphing block 310, the first graphic element 313a as in FIG. 4C is generated. The generation of the first graphic element 313a is similar to the method of generating the above-mentioned pen brush and line. The only difference is in the format of the real-time graphic information. So it is not further described here. It should be mentioned that the user can click the deformation element 324 to deform the first graphic elements 311, 312, 313a and move their display positions. After the user clicks the deformation element 324, he clicks the first graphic element 313a to be adjusted in the graphing block 310. In this case, the graphing module 113 generates the corresponding real-time graphic information, such as "<Trans tg= "i_1" . . . >", where "Trans" represents deformation and "tg="i_1"" means that the deformation or moving is done to the first graphic element (e.g., the first graphic element 313a) of the ID number "i_1". Afterwards, the graphing module 113 follows the real-time graphic information to adjust the corresponding first graphic element 313a for display and appends the real-time graphic information to the graphing buffer. Suppose the real-time graphic information is to deform the first graphic element 313a. Then as shown in FIG. 4D, the first graphic element 313a is magnified to the first graphic element 313b. One can even use the cursor 301 to move the first graphic element 313b to generate the corresponding real-time graphic information. The graphing module 113 follows the real-time graphic information to generate the first graphic element 313c as shown in FIG. 4E for display.

Figure 4E:
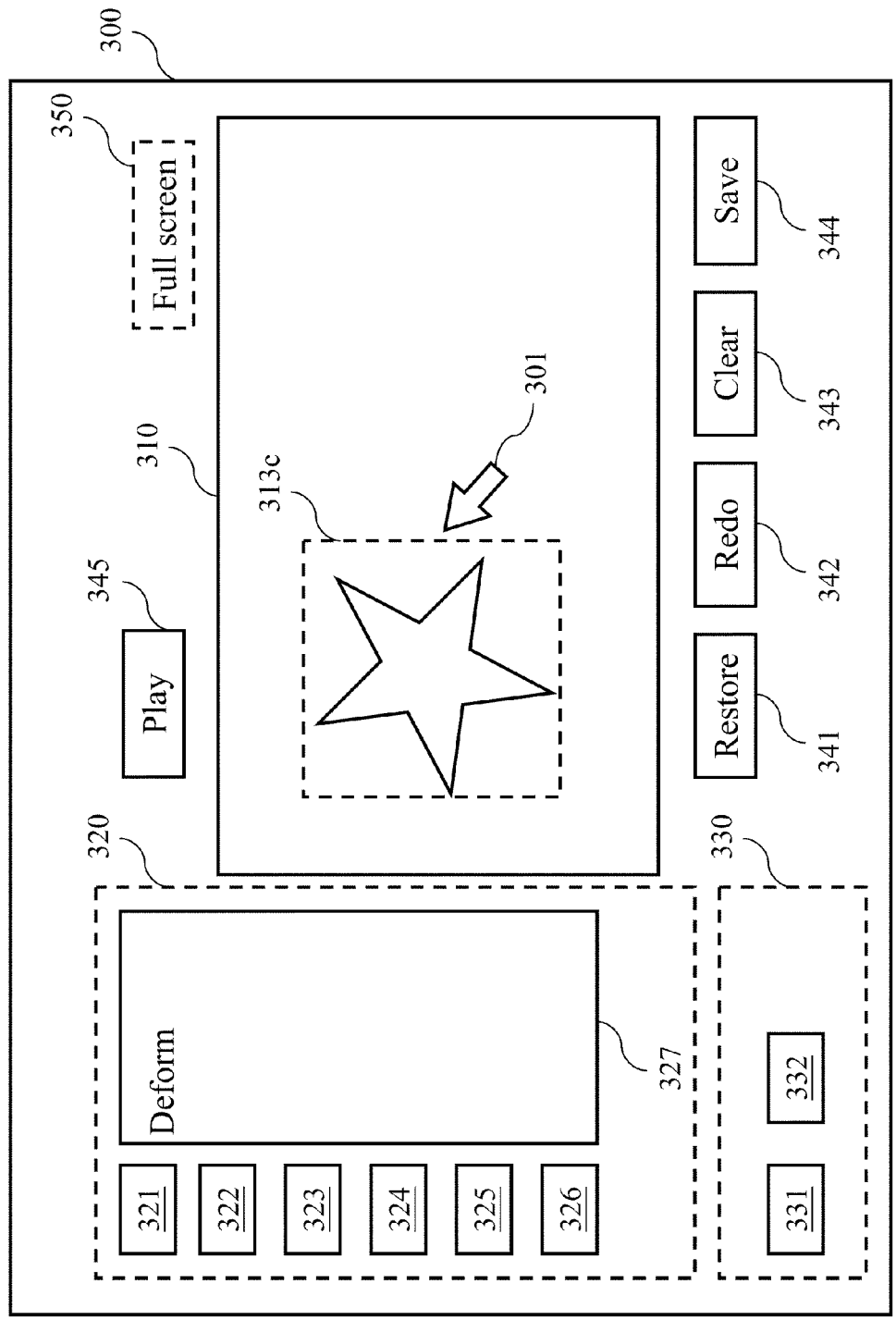

Take FIGS. 4C to 4E as an example. The real-time graphic information recorded in the graphing buffer is as follows:

```
<Stamp id="i_8" tp="star"......>...</Stamp>
<Trans tg="i_8"......>
<p px="50" py="50" r="0" sx="1" sy="1" />
<p px="50" py="50" r="0" sx="2" sy="2" />
......
<p px="50" py="50" r="0" sx="6" sy="6" />
</Trans>
<Trans tg="i_8"......>
    <p px="50" py="50" r="0" sx="6" sy="6" />
    <p px="50" py="50" r="-1" sx="6" sy="6" />
    ......
    <p px="50" py="50" r="-5" sx="6" sy="6" />
</Trans>
```

Here "Stamp" represents using the stamp, "i_8" represents the ID number of the stamp, "star" represents that the type of the stamp is a star, and "Trans tg="i_8"" means that the stamp of ID number "i_8" is adjusted. Moreover, "<p px="50" py="50" r="0" sx="1" sy="1" />" to "<p px="50" py="50" r="0" sx="6" sy="6" />" and "<p px="50" py="50" r="0" sx="6" sy="6" />" to "p px="50" py="50" r="-5" sx="6" sy="6" />" represent detailed adjusting steps. In particular, "px" and "py" are the coordinates of the stamp. "r" is the axis angle of the stamp, which is positive for clockwise rotations and negative for counterclockwise rotations. "sx" and "sy" are the size of the stamp. It should be noted that even the above example explicitly gives the real-time graphic information recorded in the graphing buffer, the invention does not have any limitation on the parameters and their names contained in the real-time graphic information.

Figure 4F:
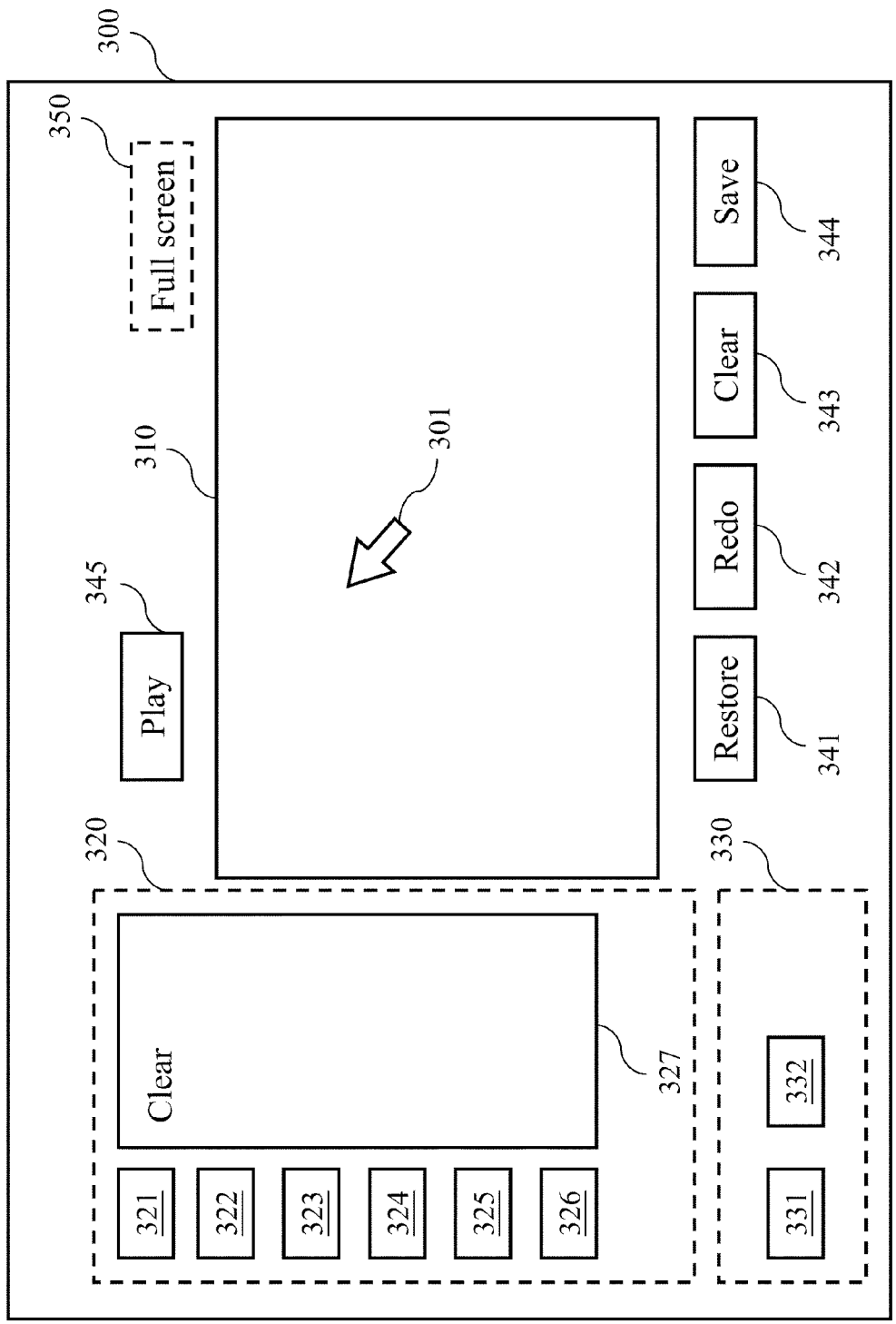
Figure 4G:
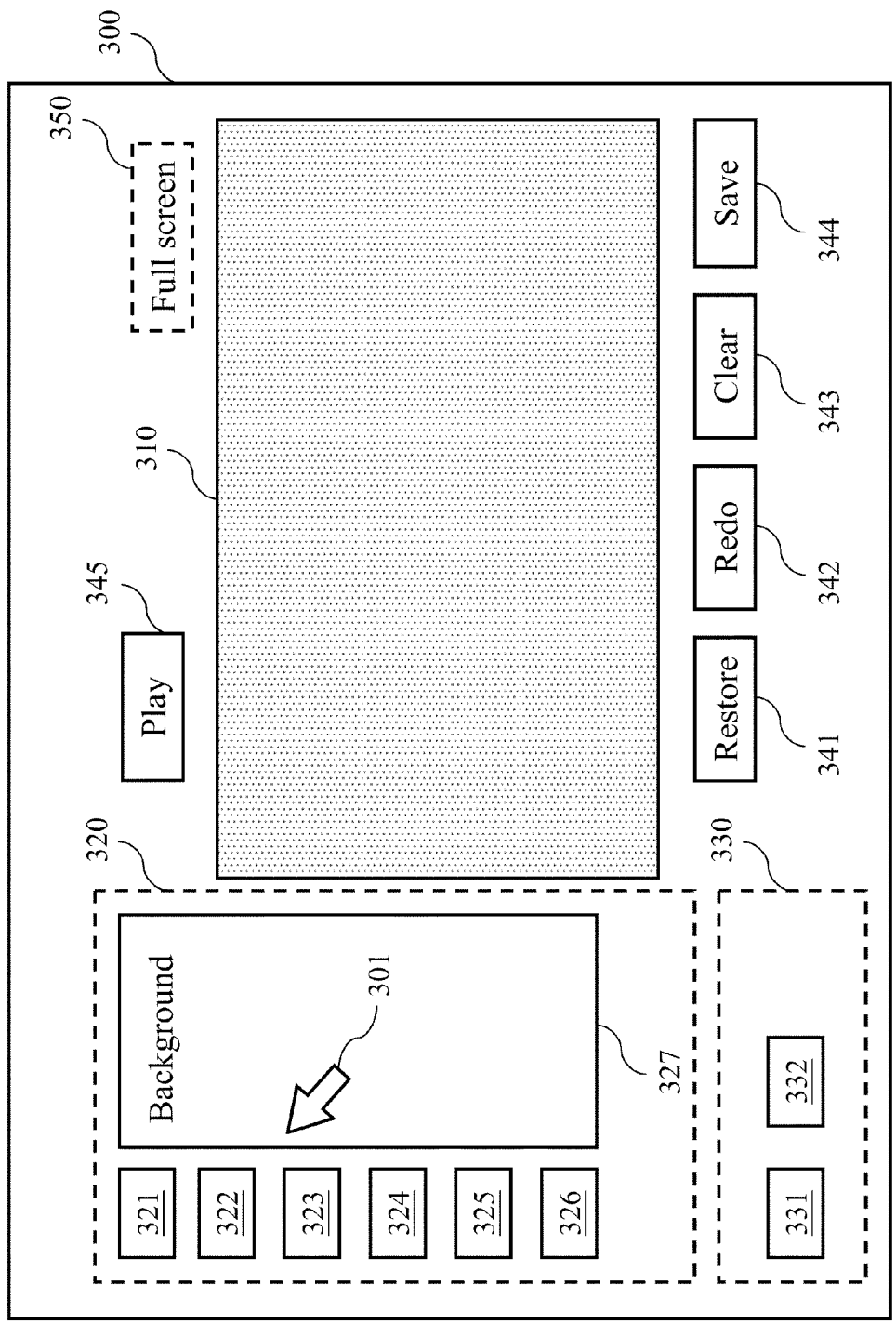

After the user clicks the clear element 325, the first graphic can be clicked element 313c in the graphing block 310 to be cleared. The ID number of the first graphic element 313c is used to delete the corresponding real-time graphic information in the graphing buffer. The cleared result is shown in FIG. 4F. The user can also click the background element 326 to set the background color. Suppose the real-time graphic information is "<Art canvasColor="111"> . . . </Art>", where "Art" represents the starting point of the drawing, "/Art" represents the ending point of the drawing, "canvasColor" represents the canvas color (i.e., the background color), and "111" is the assigned color. If the user assigns the color, then the value "111" changes with the assigned color. If the user does not assign any color, then the default background color is used. After the user assigned the color, then the graphing block 310 displays the assigned color (denoted by the meshed points) as in FIG. 4G.

Figure 5A:
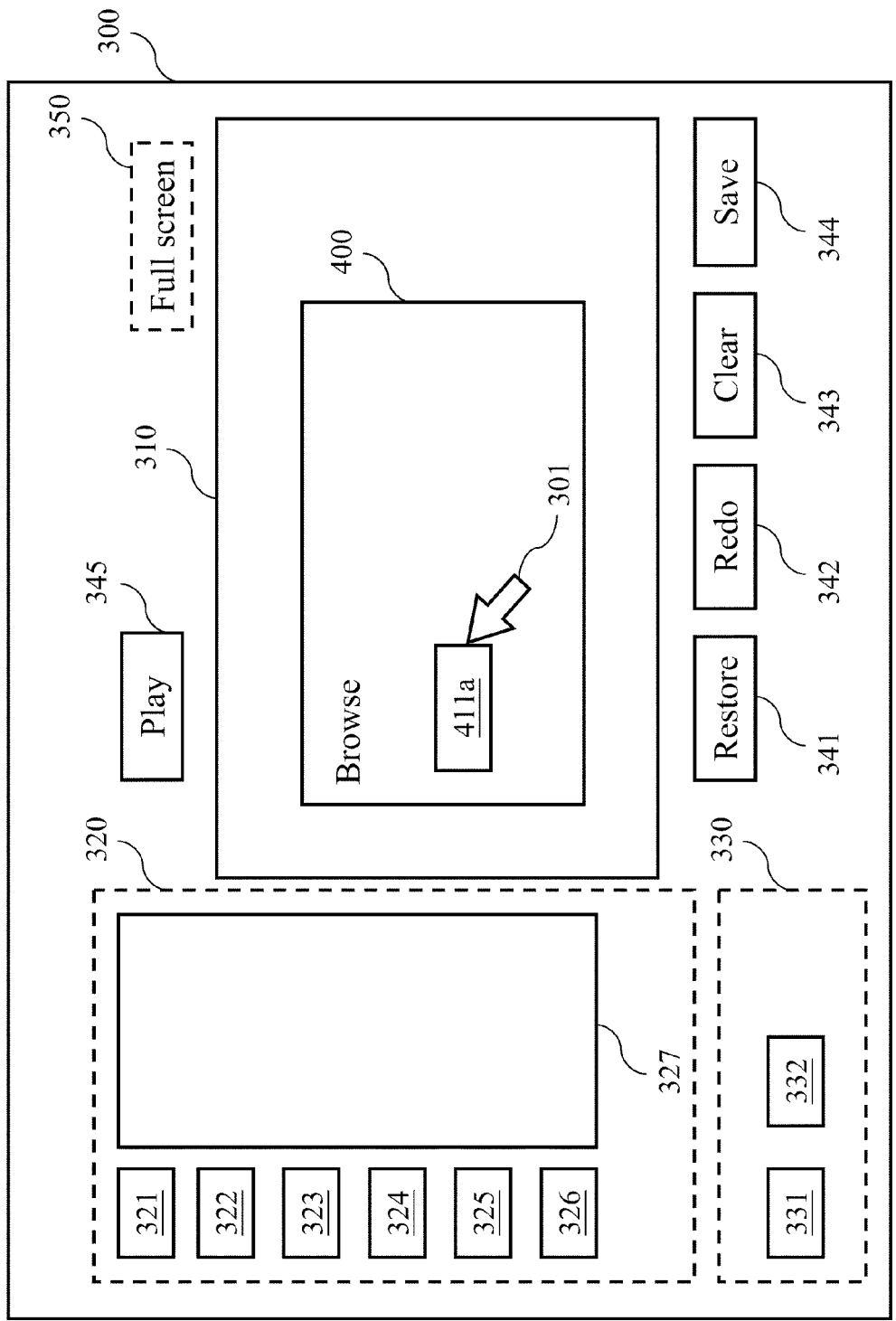
FIGS. 5A to 5C are schematic views of redrawing on a quote image or an inserted network image according to the invention.
Figure 5B:
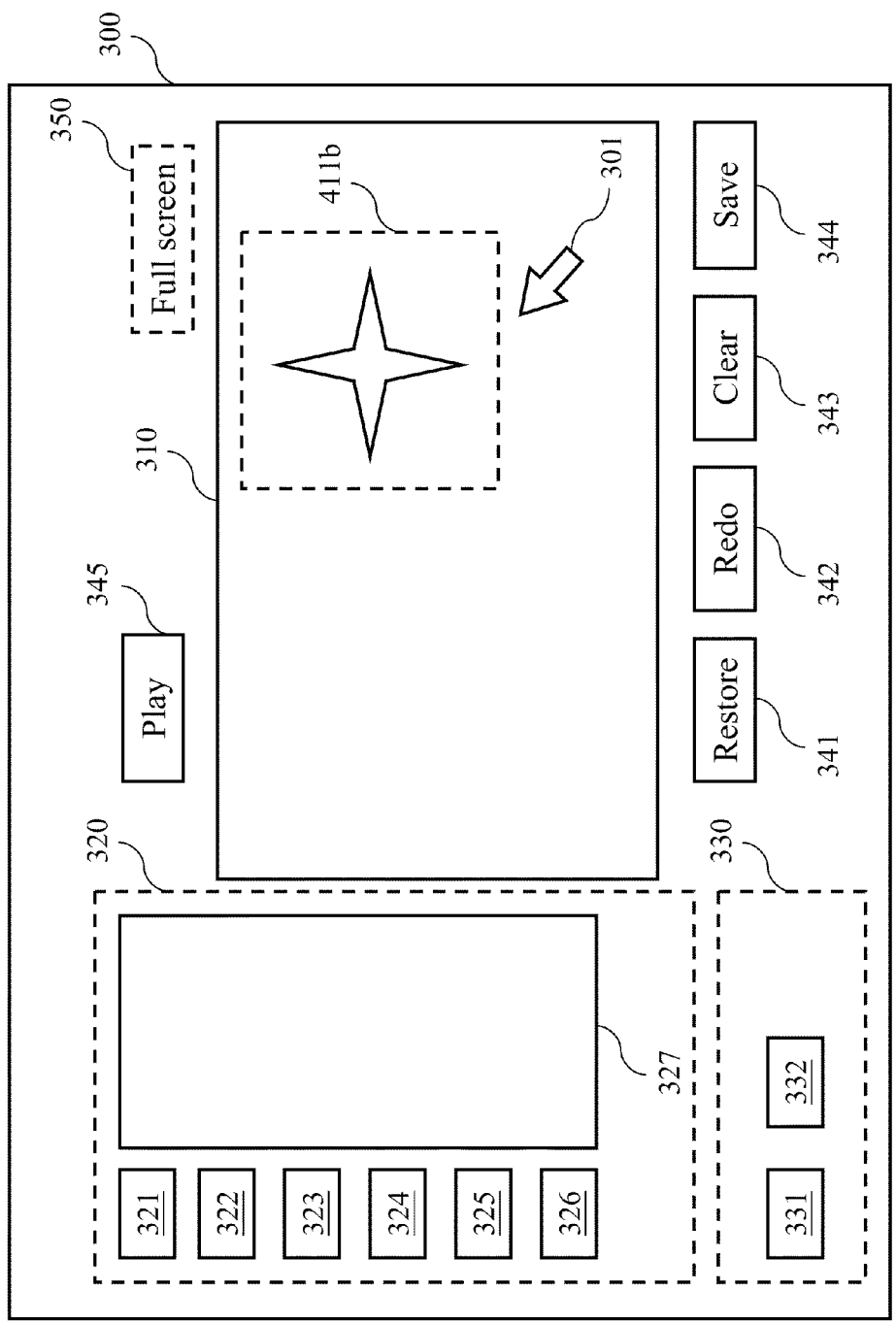
Figure 5C:
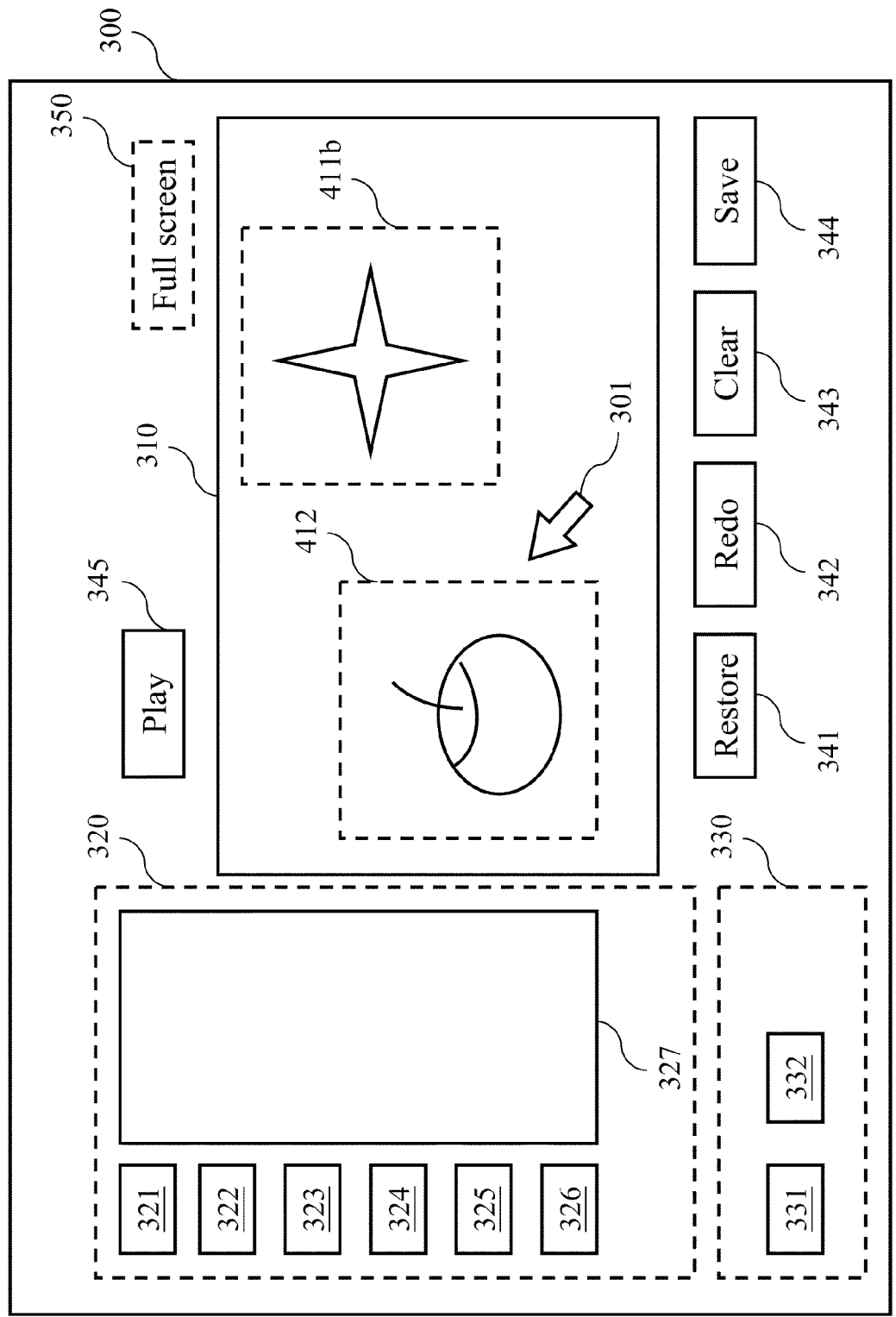

Please refer to FIGS. 5A to 5C, which are schematic views of an example using the invention to redraw a quote image or a network image. In addition to selecting via the selecting block 320, the user can further click the internal quote 331, as shown in FIG. 5A, to open a browser window 400, thereby connecting to the graphic database for browsing previews 411a of the quote images. After the user clicks a quote image preview 411a, the setting module 112 sets the loading condition as "quote" and sets the ID code (e.g., "gYcMt") of the quote image corresponding to the quote image preview 411a as the loading parameter. Since the loading condition is "quote", the quoting module 114 generates the corresponding quote element tag according to the loading parameter, such as "<QArt id="i_1" qid="gYcMt" . . . ></QArt>", and appends it to the graphing buffer. It also loads the corresponding quote image from the graphic database 201 according to "qid" of the quote element tag. The quote graphic information contained in the quote image is appended to the graphing buffer. The second graphic element 411b as shown in FIG. 5B is generated according to the quote graphic information for display. At this point, the user can combine the selecting block 320 and the graphing block 310 to redraw the second graphic element 411b.

The following explains the change before and after the quote element tag is appended to the graphing buffer. Suppose the contents of the message stored in the graphing buffer is as follows:

```
<Art canvasColor="111">
    ......
    <Pen......>
        <p....../>
        ......
</Art>
```

The quote graphic information recorded in the quote image corresponding to the quote image preview 411a is as follows:

```
<Art qid="gYcMt"......>
    <Pen.....>
        <p ....... />
        ......
</Art>
```

Then when the quoting module 114 appends the quote graphic information contained in the quote image to the graphing buffer, the contents recorded in the graphing buffer becomes:

```
<Art canvasColor="111">
    ......
    <Pen......>
        <p ....... />
        ......
    <QArt id="i_1" qid="gYcMt" ......></QArt>
</Art>
<Quote qid= "gYcMt"...... >
    <Pen.....>
        <p ....... />
        ......
</Quote>
```

Here the boldfaced part is the quote element tag appended to the graphing buffer. The ID number of the quote element tag is "i_1", and the ID code of the quote graphic information is "gYcMt". The quote graphic information contained in the quote image will be stored in the graphing buffer and recorded between "<Quote qid="gYcMt" . . . >" and "</Quote>". It should be noted that the quote element tag and the corresponding quote graphic information have the same "qid". In the above-mentioned example, the "qid" is "gYcMt".

Moreover, the user can click the external insertion 332 to enter the web address of the network image (e.g., "http://a.b.c/apple.gif"). In this case, the setting module 112 sets the loading condition as "insertion" and sets the web address as the loading parameter. Since the loading condition is "insertion", the inserting module 115 generates a media element tag embedded with the loading parameter, such as "http://a.b.c/apple.gif". For example, the media element tag is "<Media url="http://a.b.c/apple.gif" . . . > . . . </Media>" and is appended to the graphing buffer. The network image at the web address "http://a.b.c/apple.gif" is loaded according to the media element tag as the media image information and stored in the graphing buffer. The third graphic element 412 as shown in FIG. 5C is generated according to the media image information and displayed. In this embodiment, the network image is a dot-matrix graph. Therefore, the third graphic element 412 is also a dot-matrix graph.

The following describes the change before the graphing buffer is appended with the media element tag. Suppose the contents recorded in the graphing buffer is as follows:

```
<Art canvasColor="111">
    ......
    <Pen......>
        <p ....... />
        ......
</Art>
```

When the inserting module 115 appends the media element tag "<Media url="http://a.b.c/apple.gif" . . . > . . . </Media>" to the graphing buffer, the contents recorded in the graphing buffer is as follows:

```
<Art canvasColor="111">
    ......
        <Pen ......>
            <p ....../>
        ......
    <Media url="http://a.b.c/apple.gif" ...... >...</Media>
</Art>
```

Here the boldfaced part is the media element tag newly appended to the graphing buffer. In practice, the media element tag can further includes the ID number, such as "<Media id="i_6" url="http://a.b.c/apple.gif" ... > ... </Media>", where "id="i_6"" represents that the ID number of the media element tag is "i_6". The corresponding media image information also has the same ID number, so that the display method of the media image information can be adjusted accordingly.

It should be explained that when the user draws in the graphing block 310, he can click the restoring element 341 to return to the previous drawing step; that is, he can delete the real-time graphic information or quote element tag or media element tag before the tag "</Art>" in the graphing buffer. He can also click the redo element 342 to recover the deleted real-time graphic information or quote element tag or media element tag. The user can even click the clearing element 343 to delete all contents in the graphing buffer. Besides, the user can click the storing element 344 to transmit the quote element tag, real-time graphic information, or media element tag in the graphing buffer via the storing module 117 to the server end 20. It is stored in the graphic database 201 as a quote image. The user can click the playing element 345 to load in sequence the real-time graphic information, quote graphic information or media image information from the graphic buffer. The loaded real-time graphic information, quote graphic information or media image information is then used to generate or adjust the corresponding first graphic element, the second graphic element, or the third graphic element for display. After the user clicks the full-screen element 350, the creation interface 300 is magnified (to the full screen) for the user to draw in the graphing block 310.

Figure 6:
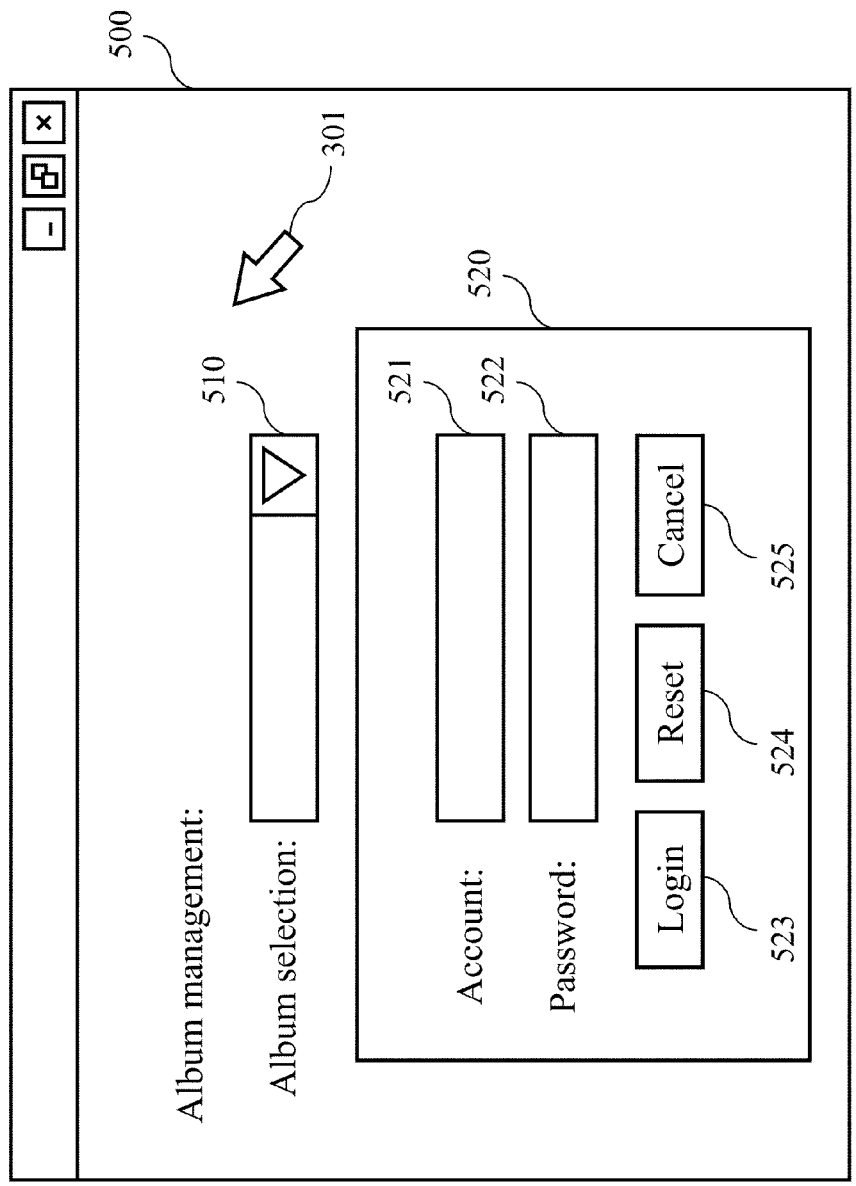
FIG. 6 is a schematic view of managing a photo album according to the invention.

Finally, please refer to FIG. 6, which is a schematic view of using the invention to manage a photo album. In practice, the browser window 400 (with reference to FIG. 5A) can further display the network images stored in a network album (stored in the network album server end 40). In order to conveniently and successfully browse the network album, the user can click the hyperlink (not shown) in the web page to open the setting window 500 for obtaining the authorization code of the network album. The authorization code is obtained by selecting a network album of the user via the album selecting element 510. This then connects to the corresponding network album server end 40 (e.g., Flickr, Picasa, etc). A login web page is downloaded from the network album server end 40 and displayed in a login sub page 520. At this moment, the user enters his account and password in the account entering block 521 and the password entering block 522. Afterwards, the user uses the cursor 301 to click the login element 523 for logging into the album. After the login is successful, the authorization code is obtained from the network album server end 40. The browser window 400 can thus normally open the network images that protected by account and password. Moreover, when the user enters incorrect account and password, he can click the reset element 524 to reset the entries. He can even click the canceling element 525 to cancel the login.

It should be mentioned that in practice, the server end 20 can further includes a member database (not shown) to store member accounts and passwords for the user to login. Only users who successfully log into the system can operate the creation interface 300. After the user successfully log into the network album server end 40 via the login web page shown in the login sub page 520 and obtains the authorization code, the member database can further stores this authorization code and associate it with the member account.

In summary, the invention differs from the prior art in that the client end 10 executes a web page document 11 embedded with a web page procedure, which initializes the graphing block 310 in the web page document 11 and allows the user to directly draw using the cursor 301. The invention further provides quote images previously stored in the server end 20 or inserts image resources in an external network. After the user finishes drawing, the result is stored in the server end 20 as a quote image, which is then shared with other users by quoting. The invention thus solves the problem in the prior art and increases the interactivity of network digital creations.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended Claims as well as any Claims presented in the future will cover all modifications that fall within the true scope of the invention.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. Hence, alternative arrangements and/or quantities of different modules or other components can occur without departing from the spirit and scope of the invention. Similarly, components that are not explicitly mentioned in this specification can be included in various embodiments of this invention without departing from the spirit and scope of the invention. Also, functions and logic described as being performed in certain components in various embodiments of this invention can, as would be apparent to one skilled in the art, be readily performed in whole or in part in different components or in different configurations of components not explicitly mentioned in this specification, without departing from the spirit and scope of the invention. Accordingly, the specification and drawings are to be regarded in an illustrative rather than a restrictive sense.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," "various embodiments" or "other embodiments" means that a particular feature, structure, or characteristic described in connection with the embodiments is included in at least some embodiments, but not necessarily all embodiments. References to "an embodiment," "one embodiment," or "some embodiments" are not necessarily all referring to the same embodiments. If the specification states a component, feature, structure, or characteristic "may," "can," "might," or "could" be included, that particular component, feature, structure, or characteristic is not required to be included. If the specification or Claims refer to "a" or "an" element, that does not mean there is only one of the element. If the specification or Claims refer to an "additional" element, that does not preclude there being more than one of the additional element.

The invention claimed is:

1. A network digital creation system, comprising:
a server end for storing a web page document in a non-transitory storage medium and including:
a graphic database, which stores at least one quote image, each of which includes at least one quote graphic information, the quote graphic information comprising at least one parameter of stroke path, deformation, rotation, stamp, color, size, transparency, ID number, ID code, background, and storage position relating to a vector graph; and
a client end including at least one non-transitory storage medium, for downloading the web page document from the server end and executing a web page procedure embedded therein, the web page procedure including:
an initializing module, which initializes a graphing buffer including a first memory block and a second memory block in the storage medium, and initializes a graphing block, a selecting block, and a searching block on a web page browser displaying the web page document;
a setting module, which sets a graphing parameter via the selecting block and sets a loading condition and a loading parameter via the searching block;
a graphing module, which generates at least one real-time graphic information in the graphing block according to graphing parameter and the cursor operation, appends the real-time graphic information in sequence of the real-time graphic information generated to the first memory block, and generates or adjusts a first graphic element according to the real-time graphic information for display; and
a quoting module, which generates a quote element tag corresponding to the loading parameter and appends the quota element tag to the first memory block when the loading condition is set as quote, appends at least one quote graphic information from the graphic database to the second memory block in sequence of the quote graphic information according to the quote element tag when the quote graphic information was not loaded to the second memory block and generates a second graphic element according to the quote graphic information for display.

2. The system of claim 1, wherein the web page procedure further includes a playing module which generates or adjusts the first graphic element or the second graphic element according to the real-time graphic information or the quote element tag in sequence of which stored in the first memory block for playing.

3. The system of claim 2, wherein the playing module adjusts a time axis to control the display order of the first graphic element or the second graphic element.

4. The system of claim 2, wherein the playing module further sets a speed parameter to control the display speed of the first graphic element or the second graphic element.

5. The system of claim 1, wherein the web page procedure further includes a storing module for transmitting the real-time graphic information or the quote element tag in the first memory block to the graphic database on the server end as the quote image.

6. The system of claim 1, wherein the quote graphic information and the real-time graphic information include at least one parameter of pen path, deformation, rotation, stamp, color, size, transparency, ID number, ID code, background, and storage position, the media element tag includes at least one of ID number, size, and web address, and the quote element tag includes at least one of ID number, ID code, and size.

7. The system of claim 1, wherein the selecting block includes the selection of pen, line, stamp, deformation, clear, and background and, after selecting one of them, the corresponding settings are provided to set the graphing parameter.

8. The system of claim 1, wherein the searching block allows the input of a searching condition, which is then used to search and display the at least one matched quote image in the graphic database and, after selecting the at least one of the matched quote image, sets the loading condition as quote, and the ID code of the selected quote image is set as the loading parameter.

9. The system of claim 1, wherein the loading parameter includes at least one of storage position, ID code, and web address.

10. The system of claim 1, wherein the web page procedure further includes an inserting module, which generates a media element tag embedded with the loading parameter and appends the media element tag to the first memory block when the loading condition is set as insertion, loads a network image according to the media element tag as a media image information and stores the media image information to a third memory block of the graphing buffer when the media image information was not stored in the third memory block, and generates a third image element according to the media image information for display.

11. A network digital creation method applied to a client end, the client end connects to a server end including a graphic database, comprising the steps of:
downloading a web page document from the server end to the client end; and
executing a web page procedure of the web page document on the client end includes the steps of:
initializing a graphing buffer including a first memory block and a second memory block, and initializing a graphing block, a selecting block, and a searching block on a web page browser displaying the web page document;
generating a graphic information;
when the graphic information is a real-time graphic information generated based on a graphing parameter set by the selecting block, appending the real-time graphic information in sequence of the real-time graphic information generated to the first memory block, and displaying a first graphic element according to the real-time graphic information; and
when the graphic information is a quota element tag generated based on a loading condition set as quote by the searching block, appending the quota element tag in sequence of the quota element tag generated to the first memory block, appending at least one quote graphic information from the graphic database to the second memory block in sequence of the quote graphic information stored in the graphic database if the quota graphic information is not loaded to the second memory block, and displaying a second graphic element according to the quote graphic information;
wherein the quote graphic information comprises at least one parameter of stroke path, deformation, rotation, stamp, color, size, transparency, ID number, ID code, background, and storage position relating to a vector graph.

12. The method of claim 11 further comprising the step of when the graphic information is a media element tag generated based on a loading condition set as insertion by the searching block, appending the media element tag in sequence of the quota element tag generated to the first memory block, loading a network image according to the media element tag as a media image information and storing the media image information to a third memory block of the graphing buffer if the media image information was not stored in the third memory block, and displaying a third image element according to the media image information.

13. The method of claim 11 further comprising the step of displaying the first graphic element or the second graphic element according to the real-time graphic information or the quote graphic information in sequence of which stored in the first memory block.

14. The method of claim 11 further comprising the step of setting a speed parameter to control the display speed of the first graphic element or the second graphic element.

15. The method of claim 11 further comprising the step of transmitting the real-time graphic information or the quote element tag in the first memory block to the graphic database in the server end as the quote image.

16. The method of claim 11, wherein the searching block allows the input of a searching condition, which is then used to search and display the at least one matched quote image in the graphic database and, after selecting the at least one of the matched quote image, sets the loading condition as quote, and the ID code of the selected quote image is set as the loading parameter.

17. A network digital creation display system applied to a client end, the client end connects to a server end including a graphic database and downloads a web page document embedded a web page procedure, the web page procedure comprising:

an initializing module, which initializes a graphing buffer including a first memory block and a second memory block in a storage medium of the client end, and initializes a graphing block, a selecting block, and a searching block on a web page browser displaying the web page document;

a loading module, which loads at least one graphic information from the graphic database to the first memory block, wherein each of the graphic information loaded in sequence of the graphic information store in the graphic database;

a graphing module, which displays a first graphic element according to a real-time graphic information when the loaded graphic information is the real-time graphic information; and a quote module, which loads at least one quote graphic information from the graphic database to the second memory block if the second memory do not store the quote graphic information, and displays a second graphic element according to the quote graphic information when the loaded graphic information is a quota element tag;

wherein the quote graphic information comprises at least one parameter of stroke path, deformation, rotation, stamp, color, size, transparency, ID number, ID code, background, and storage position relating to a vector graph.

18. The system of claim 17, wherein the web page procedure further includes a inserting module which loads a network image according to the media element tag as a media graphic information to a third memory block of the graphing buffer if the third memory do not store the media graphic information, and displays a third graphic element according to the media graphic information when the loaded graphic information is an media element tag.

19. The system of claim 17, wherein the web page procedure further includes a playing module which displays the first graphic element and the second graphic element according to the real-time graphic information or the quote element tag in sequence of which stored in the first memory block.

20. The system of claim 19, wherein the playing module further displays the second graphic element according to the quote graphic information represented the second graphic element in sequence of the quote graphic information stored in the second memory block.

21. The system of claim 19, wherein the playing module further adjusts a time axis to control the display order of the first graphic element or the second graphic element.

22. The system of claim 19, wherein the playing module further sets a speed parameter to control the display speed of the first graphic element or the second graphic element.

* * * * *